United States Patent [19]
Ueno et al.

[11] Patent Number: 5,581,789
[45] Date of Patent: Dec. 3, 1996

[54] DATA TRANSFER SYSTEM

[75] Inventors: Hitoshi Ueno, Zama; Takao Satoh, Sagamihara; Tetsuji Ogawa, Hadano; Toshiyuki Kinoshita, Tokyo; Masaichiro Yoshioka, Sagamihara, all of Japan

[73] Assignee: Hitachi, Ltd., Tokyo, Japan

[21] Appl. No.: 6,837

[22] Filed: Jan. 21, 1993

[30] Foreign Application Priority Data

Jan. 28, 1992 [JP] Japan .................................. 4-012815

[51] Int. Cl.⁶ .................................................. G06F 13/00
[52] U.S. Cl. .......................... 395/840; 395/250; 395/872; 364/238.3; 364/239; 364/260; 364/DIG. 1
[58] Field of Search ...................... 395/800, 275, 395/250, 425, 200.08, 200.15, 375, 474, 825, 840, 853, 872; 364/200

[56] References Cited

U.S. PATENT DOCUMENTS

| | | | |
|---|---|---|---|
| 4,092,715 | 4/1978 | Scriver | 364/200 |
| 4,173,783 | 11/1979 | Couleur et al. | 364/200 |
| 4,344,132 | 8/1982 | Dixon et al. | 364/200 |
| 4,407,016 | 9/1983 | Bagliss et al. | 364/200 |
| 4,476,524 | 10/1984 | Brown et al. | 395/306 |
| 4,703,449 | 10/1987 | Berman | 364/900 |
| 4,843,544 | 6/1989 | DuLac et al. | 364/200 |
| 5,157,770 | 10/1992 | Beardsley et al. | 395/439 |
| 5,167,020 | 10/1992 | Kahn et al. | 395/250 |
| 5,247,616 | 9/1993 | Berggren | 395/200.08 |
| 5,293,603 | 3/1994 | MacWilliams et al. | 395/425 |

*Primary Examiner*—Alpesh M. Shah
*Attorney, Agent, or Firm*—Fay Sharpe Beall Fagan Minnich & McKee

[57] ABSTRACT

In a highspeed and large-capacity data transfer operation effected between an extended storage unit and an input/output unit, such a data transfer system is provided, capable of preventing a performance deterioration caused by a lack of main storage capacity with employing a buffer having a large memory capacity, and deterioration of a transfer throughput caused by an overhead of an input/output operation due to a use of a buffer having a small memory capacity. There are provided a CCW for directly designating the extended storage unit as an object of a data transfer operation, and a signal line for initiating from a channel the data transfer operation between HSA-extended storage unit. Furthermore, buffers having the planes and with a small memory capacity are prepared on the HSA. The data transfer operation is carried out between the channel and the buffer with one plane, and the data transfer operation is performed between the extended storage unit and the buffer having the other plane in parallel with the first-mentioned data transfer operation. After the data transfer operations have been accomplished, a data transfer operation for the next block is executed by substituting one plane with the other plane.

4 Claims, 13 Drawing Sheets

DATA TRANSFER SYSTEM

BACKGROUND OF THE INVENTION

The present invention generally relates to a central processing unit equipped with an extended storage unit corresponding to a highspeed access storage unit provided independently from a main storage unit. More particularly, the present invention is directed to a data transfer unit suitable for improving throughput of a data transfer effected between an input/output unit and the extended storage unit in the central processing unit to which the input/output unit capable of transferring the data having a large capacity at a high speed is connected.

There is a conventional data processing system employing the page storage unit, as described in U.S. Pat. No. 4,476,524, which is similar to the above-described central processing system equipped with the memory unit directly accessible from the instruction processor and the extended storage unit for executing the data transfer operation between this memory unit and the extended storage unit.

In accordance with the above-described conventional data processing system, the extended storage unit includes the data transfer path connected therewith the main storage unit. When the program is executed in the instruction processor, the data transfer operation is executed by executing the synchronous instruction of the instruction processor, or initiating the asynchronous channel program. The data transfer operation effected by the asynchronous channel program in the instruction processor is performed by providing the data transfer buffers on the main storage unit and by initiating the channel program with employment of the channel command word used for executing the data transfer operation between the main storage unit and the extended storage unit.

For instance, the read operation from the input/output unit to the extended storage unit with employment of the channel program is executed by combining the below-mentioned two channel command words in the above-described prior art:

(1) The data which has been transferred from the input/output unit to the channel unit is transferred to the data transfer buffer provided in the main storage unit by executing the read command of the input/output unit.

(2) The data stored in the data transfer buffer is transferred to the extended storage unit in response to the data transfer command from the main storage unit to the extended storage unit.

The data write operation is carried out in a similar manner to that of the above-explained data read operation. That is to say, after the data transfer operation has been executed from the extended storage unit to the main storage unit, the data is transferred from the main storage unit to the input/output unit.

The above-described conventional data processing system has such a problem that the data transfer operation cannot be effectively performed between the extended storage unit and the input/output unit for transferring the data having a large capacity at a high transfer speed. In other words, according to the prior art data processing system, since the main storage unit is used as the data transfer buffer, the following data transfer methods must be employed. Namely, the data transfer with a small capacity is repeatedly performed many times by preparing the data transfer buffer with a relatively small capacity and utilizing a large number of channel command words, or the data transfer with a large capacity is repeatedly carried out at a few time by preparing the data transfer buffer with a large capacity and utilizing a relatively small number of channel command words. Otherwise, the intermediate data transfer method must be employed in view of the capacity of the data transfer operation.

However, in the above-described method for preparing the data transfer buffer with such a small capacity on the main storage unit, the process time is required in that the channel command word is read and analyzed by the channel unit, and furthermore this analyzed command is transferred to the input/output unit. Since this process time becomes such a lengthy time that is not negligible, as compared with the transfer time, the overhead operation by the channel unit becomes great. Accordingly, it is impossible to achieve the data transfer operation with the high throughput at the high data transfer speed. Furthermore, according to another conventional method for preparing the data transfer buffer with such a large capacity on the main storage unit, although the overhead operation of the channel unit due to the analysis time for the channel command word becomes small, since the main storage unit is occupied with the data transfer buffer having the large capacity, there are many page faults. These pages are required to execute the program by the instruction processor which is under execution in conjunction with the input/output operation. As a consequence, the actual program executing time is lowered. Then, according to the above-described intermediate method with respect to the capacity of the data transfer buffer, since the above-described drawbacks belonging to both of the conventional methods are partially conducted to the intermediate method, both of the merits, i.e., improvements in the throughput of the data transfer and the program execution performance.

With the above-described reasons for the conventional data transfer operation to the extended storage unit, it is practically impossible to realize such an effective data transfer operation that both of the data transfer throughput and the high program execution speed can be achieved.

SUMMARY OF THE INVENTION

An object of the present invention is to provide a data transfer system capable of realizing maximum data transfer throughput without substantially lowering the program execution performance.

To achieve the above-described object, according to the present invention, there are the below-mentioned three means, and a channel unit is controlled in accordance with the following methods when a channel code word for instructing a data transfer with an extended storage unit is performed.

(1) A channel command word capable of directly accessing the extended storage unit is provided as either a data transfer destination of a read command, or a data transfer direction of a write command.

(2) There are employed data transfer buffers with planes higher than double plane within a memory unit other than a main storage unit which is managed by a program executed on a central processing unit.

(3) There is provided a data transfer circuit initiating means for initiating the data transfer operation between the memory unit and the extended storage unit from the channel unit by instructing the above-described data transfer buffers.

(4) A control method of the channel unit is defined as follows:

a. In case of a read operation effected from the input/output unit to the extended storage unit, (i) the data received from the input/output unit is transferred to an empty plane of the data transfer buffer.

(ii) The data stored in the data transfer buffer is started to be transferred to the extended storage unit with employment of the data transfer circuit initiating means.

(iii) The data is transferred from the input/output unit to the next empty buffer before the above-described data transfer operation (ii) is accomplished.

(iv) The above-identified operations (ii) and (iii) are repeatedly performed until the data transfer operation with the capacity instructed by the channel command word has been completed.

b. In case of a write operation effected from the extended storage unit to the input/output unit, (i) a process to transfer the data of the extended storage unit to an empty plane of the data transfer buffer is initiated with employment of the data transfer circuit initiating means.

(ii) The data is transferred to the input/output unit from the data transfer buffer whose data has been transferred before the data transfer operation (i) is accomplished.

(iii) The above-described transfer operations (i) and (ii) are repeatedly performed until the data transfer operation with the capacity instructed by the channel command word has been completed.

The above-described object of the present invention can be achieved by executing the above-explained means and control methods.

When the channel command word capable of directly instructing the extended storage unit is employed as a unit to which data is transferred, the data transfer buffers are no longer provided on the main storage unit.

Both of the data transfer operation between the extended storage unit and the data transfer buffer and also the data transfer operation between the data transfer buffer and the input/output unit can be executed in a parallel form by providing the data transfer buffer having the plural planes on the memory unit other than the main storage unit, and also the data transfer circuit initiating means for initiating the data transfer operation between the extended storage unit and the data transfer buffer. As a result, the data transfer operation having large throughput can be achieved, as compared with the conventional data processing system for sequentially performing both of the data transfer operations.

In case that the control method for the channel unit according to the present invention is employed, even when the capacity of the data transfer buffer employed in the memory unit other than the main storage unit is selected to be small, the data transfer performance is not lowered. This is because the data with the transfer amount instructed by the channel command word are continuously transferred, while a plurality of transfer buffers are selected. As a result, even if a large amount of data transfer is instructed, the channel command words are not newly read every time the data transfer operations to the respective data transfer buffers have been accomplished, and the data transfer operation can be continued, so that there is substantially no overhead operation.

With the above-described operations, the data transfer operation with such a large capacity can be realized without deteriorating the program execution performance of the data processing system according to the present invention.

DESCRIPTION OF THE PREFERRED EMBODIMENT

Referring now to accompanying drawings, preferred embodiments of the present invention will be described.

Figure 1:
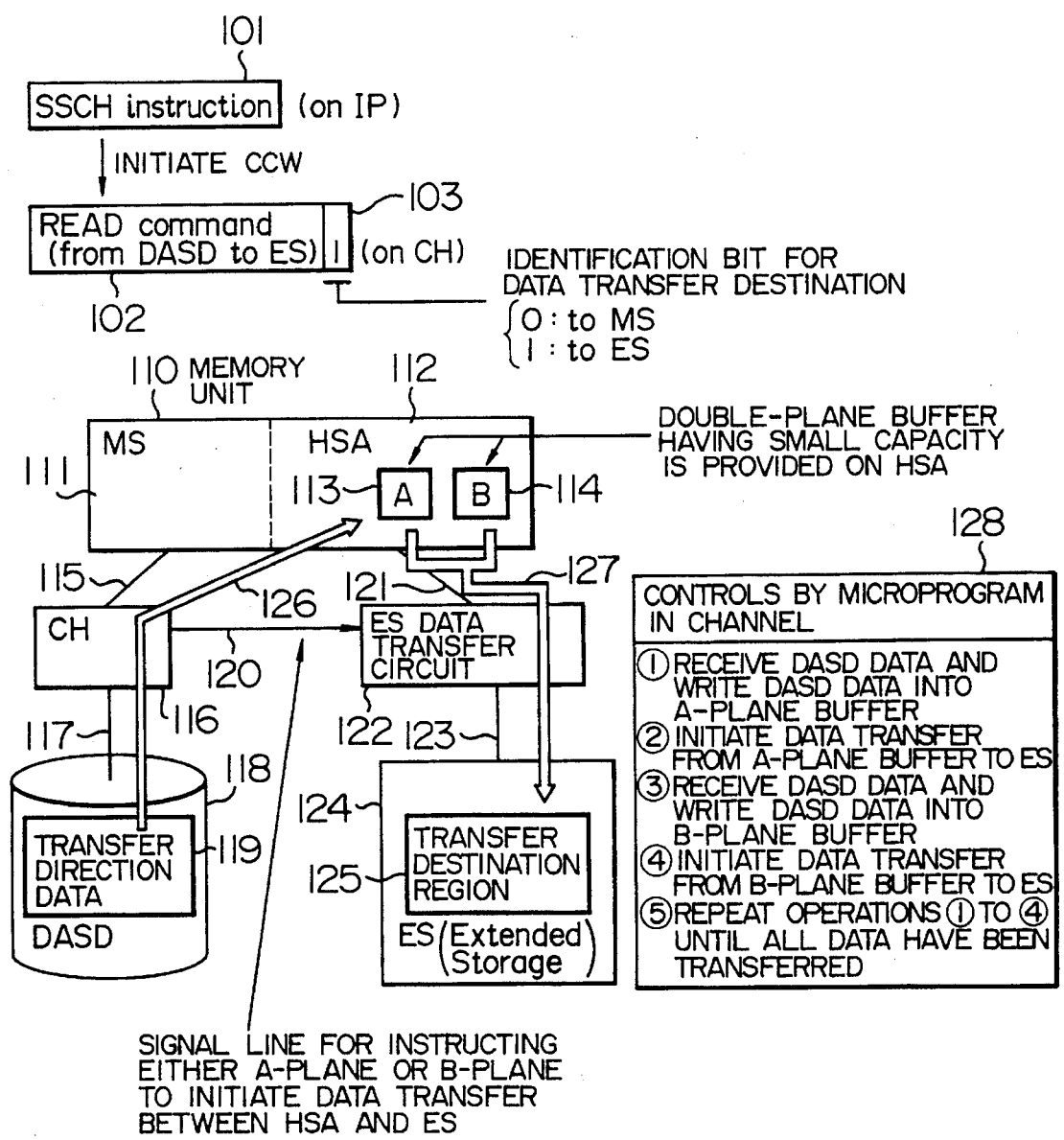
FIG. 1 is a schematic block diagram for representing a basic operation of a central processing unit according to the present invention.

FIG. 1 shows a schematic constructive diagram of a major portion of a data transfer system according to the present invention, in which an operation principle of this data transfer system during an execution of a read operation is exemplified. First, a data transfer processing operation effected between an input/output unit and an extended storage unit (will be referred to an "ES" unit) according to this preferred embodiment of the present invention will now be described with reference to FIG. 1. In FIG. 1, for instance, a direct access storage device (DASD) such as a magnetic disk unit or apparatus is utilized as the input/output unit.

The input/output processing operation for the extended storage unit is started in response to a start subchannel operation (will be referred to an "SSCH" operation) 101 issued in a program executed by an instruction processor (will be referred to an "IP"). Then, this input/output processing operation is performed in that a channel program 102 designated by the SSCH operation 101 is interpreted by a channel (CH) 116.

The DASD (direct access storage device) 118 having transfer direction data 119 is connected to the channel 116 via a data transfer path 117. The channel 116 is connected via a data transfer path 115 to a memory unit 110. The memory unit 110 is constructed of a main storage (MS) unit 111 which can be directly accessed from the program, and a hardware system area (HSA) 112 which contains control information about the hardware, and cannot be directly accessed by the program.

An extended storage unit ("ES" unit) 124 containing a transfer destination region 125 is connected via an ES data transfer circuit 122 to a data transfer path 123 which is in turn connected to the memory unit 110 via a data transfer path 121.

A channel program designated by the SSCH operation 101 includes a read command 102 with respect to the extended storage unit 124. The read command 102 contains a data transfer direction identifier bit 103 used to select either the main storage unit 111 or the extended storage unit 124 as the transfer destination. When the value of the identifier bit 103 becomes "0" it indicates that the data is transferred to the main storage unit 110, as the data transfer destination whereas when the value of the identifier bit 103 becomes "1", it indicates that the data is transferred to the extended storage unit 124. Another method for identifying data transfer destination may be conceived, which will be discussed later.

The features of the hardware arrangement according to the present invention are given as follows: A double-plane buffer (A-plane) 113 and (B-plane) 114 used for transferring ES data is provided on a hardware system area (HSA) 112. A data transfer circuit start instruction path 120 through which such an instruction is transferred that one of the double-plane buffer is designated to start the ES data transfer circuit 122.

Since a read command 102 for performing the data transfer operation to the extended storage unit is different from the conventional command, the command executing method of the present invention in the channel 116 is also different from the conventional command executing method. The read command 102 is executed by the micro-program control 128 used in the channel 116. In accordance with this micro-program control 128, (1) first of all, the data transferred from the DASD 118 is written into the A-plane of the ES data transfer buffer, and (2) upon completion of this data writing operation, the ES data transfer circuit 122 is initiated, so that the data transfer operation from the buffer A-plane 113 to the extended storage unit 124 is commenced. Since this data transfer operation is performed by the ES data transfer circuit 122, the subsequent data transfer operation is available just after initiation of the ES data transfer circuit 122 by the channel 116 has been accomplished.

Then, (3) the channel 116 causes the data transferred from the DASD 118 to be written into the B-plane 114 of the ES data transfer buffer. In accordance with this preferred embodiment, since the transfer speed (velocity) of the data transferred from the input/output unit (DASD 118) to the ES transfer buffer 113 and 114 is lower than that of the data transferred from the ES transfer buffer to the extended storage unit 124, the data transfer operation from the buffer A-plane 113 to the extended storage unit 124 has been accomplished at the time when the data writing operation to the buffer B-plane 114 has been completed, so that the buffer A-plane 113 becomes an empty state. As a consequence, thereafter, (4) the channel 116 initiates the ES data transfer circuit 122 to commence the data transfer operation from the buffer B-plane 114 to the extended storage unit 124. As this data transfer operation is effected by the ES data transfer circuit 122, the data transfer operation can be performed just after the ES data transfer circuit 122 has been initiated by the channel unit 116. The micro-program control 128 in the channel 6 repeats the processes as defined in the above-described items (1) to (4) until all of the data have been transferred.

As previously described, since the data transfer operation from the ES transfer buffers 113 and 114 to the extended storage unit 124 is carried out in conjunction with the data transfer operation effected between the DASD 118 and the ES transfer buffer, the virtual data transfer time is substantially equal to the data transfer time effected from the DASD 118 to the ES transfer buffer. Furthermore, even when the byte number of the relatively large data transfer capacity is designated by a single channel command word 102, the data transfer operation at a high efficiency can be performed without preparing a large amount of data transfer buffers.

Figure 2:
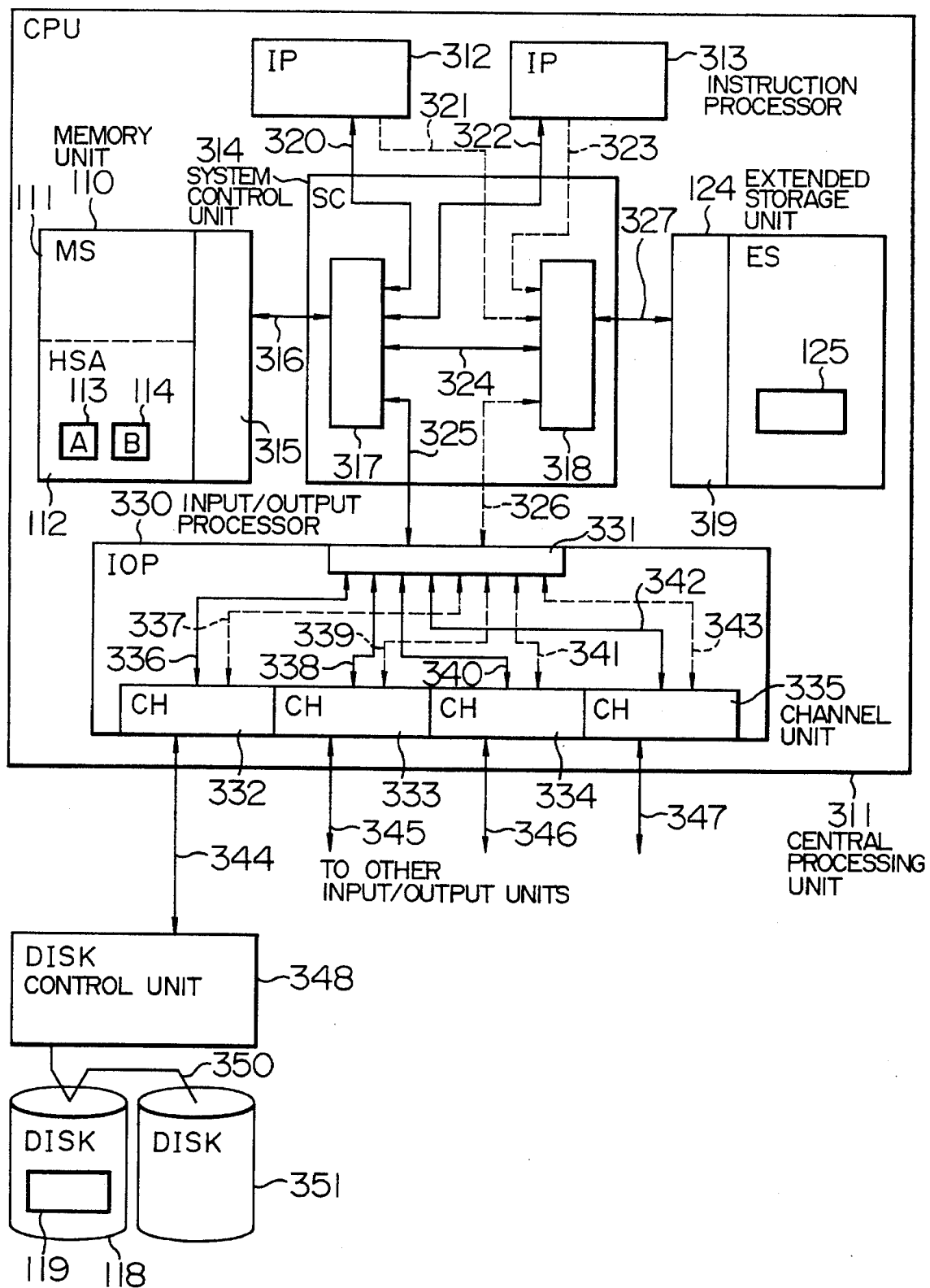
FIG. 2 shows a schematic diagram of a data transfer unit according to a preferred embodiment of the present invention.

Referring now to FIG. 2 for showing an arrangement of a data transfer unit between the input/output unit and the extended storage unit, a preferred embodiment of the present invention will be described in detail.

In a central processing unit (CPU) 311, there is provided an input/output processor 330. The input/output processor 330 is connected via a channel unit 332, an input/output cable 344, a disk control unit 348 and a signal line 350 to disk units 118 and 351 capable of performing a data transfer operation at a high speed and with a large capacity. As the disk units capable of performing the data transfer operation at high speed and with a large capacity, there are a disk unit equipped with a cache memory having a large memory capacity, and a disk array unit in which one piece of file data is distributed to a large quantity of disk units so as to read/write data in a parallel form.

The central processing unit 311 is arranged by an input/output processor (IP) 330 for performing an initiation/execution of input/output operations; instruction processors 312 and 313 for controlling an execution of an instruction; a memory unit 110; an extended storage unit 124, and also a system controller (SC) 314 for controlling connections among these units.

The input/output processor 330 includes channel (CH) units 332, 333, 334 and 335. To the respective channel units, various sorts of input/output devices are connected via input/output cables 344, 345, 346 and 347. Also, to the respective channel units, data transfer lines 336, 338 340 and 342 to the memory unit 110, and control signal lines 337, 339, 341 and 343 to the extended storage unit 124 are connected. These signal lines are collected to an SC connection interface 331, which are connected to the system control unit 314. The SC connection interface 331 selects one of a data transfer demand to the memory unit 110, which is asynchronously produced from the respective channel units 332, 333, 334 and 335, and an operation demand to the extended storage unit 124. Then, the SC connection interface 331 transmits the selected demand to the data transfer line 325 and the ES control line 326, and also executes such an exclusive control that a demand issued from another channel is transmitted after the operation of the demand issued from the selected channel unit has been completed.

The memory unit 110 is constructed of an access control unit 315, a main storage unit (MS) 111, and a hardware system area (HSA) 112. The writing operation to the memory unit 110 and the reading operation from the memory unit 110 are executed by utilizing the memory address supplied from the system control unit 314 via the signal line 316 and the identification signals of the main storage unit 111 and the hardware system area 112. In the hardware system area 112, there are employed a data transfer buffer A 113 and a data transfer buffer B 114, which are used when the data transfer operation is carried out between the input/output device (namely, a disk control unit 348 as shown in FIG. 2) and the extended storage unit 124. The memory capacities of the data transfer buffers 113 and 114 are relatively small, and are selected to on the order of 4 KB (killobytes) for both of buffer planes A and B in this preferred embodiment.

Under control of the access control unit 319, the extended storage unit 124 executes either the writing operation to the extended storage unit 124, or the reading operation from the extended storage unit 124 with employment of the address of the extended storage unit supplied from the system control unit 314 via the signal line 327. The data 119 of the disk unit 118 is transferred to the extended storage unit 124. A region 125 into which the data to be transferred to the region 119 within the disk unit 118 has been stored in this extended storage unit 124.

The instruction processors 312 and 313 are independently connected to the system control unit 314 via data transfer signal lines 320, 322 to the memory unit 110, and also via signal lines 321, 323 used to initiate the data transfer operation between the extended storage unit 124 and the memory unit 110.

The system control unit 314 is arranged by a memory-unit interface unit 317 and an ES data transfer control circuit 318. The memory-unit interface unit 317 is such a circuit for exclusively controlling the data transfer operation between this interface unit 317 and the memory unit 110, which is required via the signal lines 321, 323 and 326. The ES data transfer control circuit 318 receives an address in the memory unit 110 and an address in the extended storage unit 124, which indicate a data transfer direction and a data transfer destination respectively, and also a byte number of data to be transferred, thereby executing an exclusive control, and furthermore executing a data transfer operation via the signal line 324.

Figure 3:
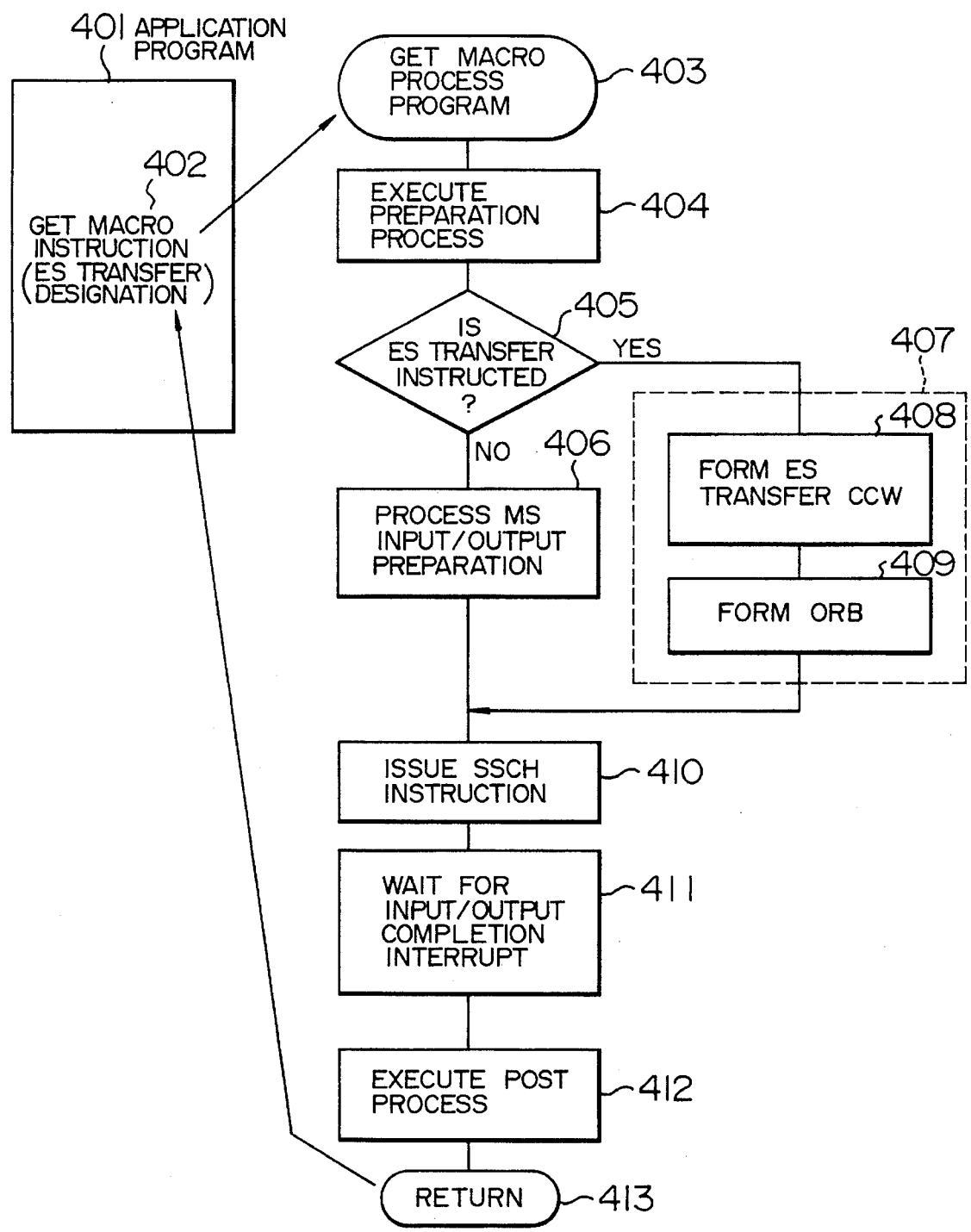
FIG. 3 is a flow chart for representing an operation of a program used in a instruction processor.

Referring now to FIG. 3, an operation of a process program used to start or initiate a data transfer between the disk unit 118 and the extended storage unit 124 will be summarized. The process indicated in FIG. 3 is executed by either the instruction processor 312, or the instruction processor 313.

An application program 401 required the data transfer operation from the disk unit 118 to the extended storage unit 124 issues a GET macro instruction 402 for designating the data transfer operation to the extended storage unit by way of an option. Upon initiation of the GET macro instruction 402, the control operation by the instruction processor 313 is transferred to the GET macro process program 403.

In accordance with the GET macro process program 403, a check is done as to whether or not a demand is issued from a correct program, a preparation process (404) for performing an initialization of information required to a control is executed, and a check is done as to whether or not this demand corresponds to the data transfer to the extended storage unit 124 based on the identifier bit 103 of the read command 102 (405). If this demand designates the data transfer to the extended storage unit 124, an input/output preparation process (407) to the extended storage unit 124 is performed. If this demand designates the data transfer to the main storage unit 111, an input/output preparation process (406) to the main storage unit 111 is executed. The input/output preparation process (407) to the extended storage unit 124 is such a process for forming information required when the input/output initialize demand is executed, and is arranged by a process (408) for forming a channel command word (CCW) and a process (409) for forming an operation request block (ORB).

Furthermore, at the stage when the information required for the data transfer has been prepared, the SSCH (start subchannel) instruction is issued to initiate the input/output operation (410). Since the input/output operation is controlled by the input/output processor 330, the GET macro process program 403 executed by either the instruction processor 312 or 313 is once brought into a waiting condition (411). This waiting condition is released by announcing an input/output completion interruption from the input/output processor 330 to the instruction processor 312 or 313. Thereafter, a post process such as an investigation of the completion condition is executed (412) and then the process operation is returned to the application program 410 (413).

A description will now be made of a channel program for executing a data transfer operation between the input/output unit and the extended storage unit with employment of an ES request read/write command with reference to FIG. 4. A channel program according to a further preferred embodiment of the present invention will now be explained with reference to FIGS. 5 to 8.

Figure 4:
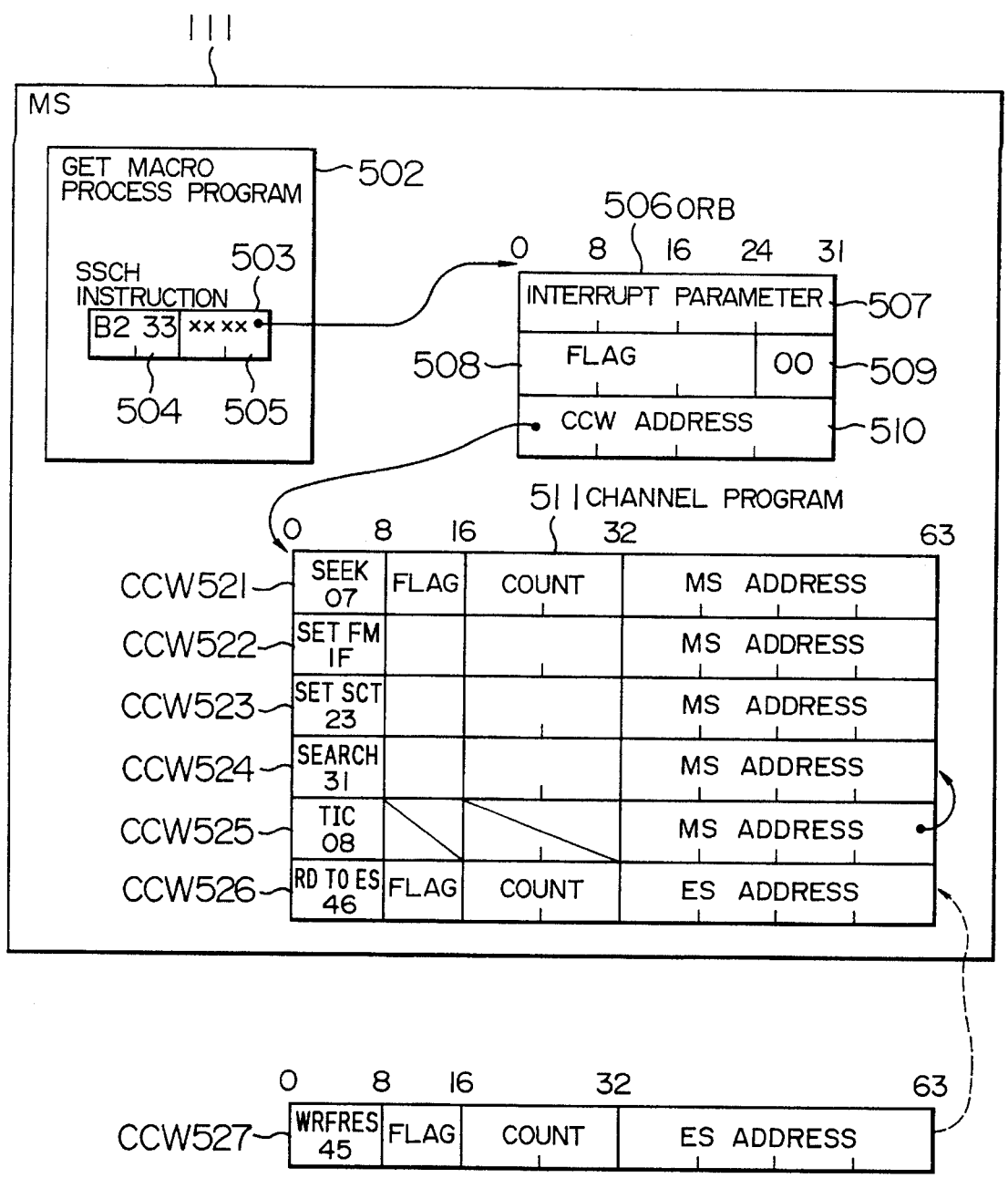
FIG. 4 indicates a channel program with employment of an extended storage request command.

FIG. 4 represents an example of an arrangement of the channel program with employment of the method for newly setting the ES request read/write command to instruct the data transfer operation from the disk unit to the extended storage unit. A load module 502 of the GET macro process program 403 which has been explained with reference to FIG. 3, has been stored in the main storage unit 111. An SSCH instruction to initiate the input/output operation has been stored as a 2-byte instruction code unit 504 having a value so-called (X'B233') in this load module, and an operation request block (ORB) 506 has been stored in an address of the main storage until indicated by an operand unit 505 thereof.

The operation request block 506 is constructed of an interrupt parameter unit 507, a flag unit 508, a zero fixing unit 509 and a CCW address unit 510. A channel program 511 which has been formed by either the instruction processor 312, or the instruction processor 313 in order to instruct an input/output operation sequence (procedure) to the input/output processor 330, is arranged at an address position of the main storage unit 111 which has been stored in the CCW address unit 510 of th operation request block 506. The channel program 511 is constructed of a plurality of channel command words, and each of these channel command words is made of 64 bits. A bit portion of this channel command word defined from a 0-th bit to an 8-th bit indicates a command code portion; a bit portion thereof from the 8-th bit to a 16-th bit shows a flag portion; a bit portion thereof from the 16-th bit to a 32nd bit denotes a count portion; and also a bit portion thereof from the 32nd bit to a 64-th bit represents an address portion.

The channel program 511 employed in this preferred embodiment is constructed of columns of the channel command word 521 to the channel command word 526. The channel command words are sequentially executed from 521 to 526 in this order.

In to the command code portion of the channel command word 521 corresponding to the first command, a seek command X'07' is stored which positions a head of the disk unit 118 to a target cylinder position, whereas an address value of a main memory is stored in the address portion, which indicates a position where a parameter related to the seek operation has been stored. To the command code portion of the next channel command word 522, a set file mask command X'1F' is stored which prevents the data from being destroyed by the erroneous writing operation. The address value of the main memory for indicating the position where a parameter required for this operation has been stored, is stored in the address portion. Furthermore, a set sector command X'23' for executing a waiting operation until the head reaches such a sector area that a target data record is present, is stored in the command code portion of the channel command word 523. An address value of the main memory for denoting a position where a parameter required for executing this operation has been stored, is stored in the address portion.

In the command code portion of the subsequent channel command word 524, a search command X'31' for searching a target data code is stored, and an address value of the main memory indicative of a position where a parameter required for performing this searching operation has been stored is stored in an address portion. In the search command, the operation to transfer the control to the next channel command word is executed every time the data record is detected. When the found data record does not correspond to the target data, a channel command word positioned just after this found data record is executed. To the contrary, if the found data record corresponds to the target data, a channel command word belonging to this data record is skipped and the subsequent channel command word is executed. In other words, when the target data record is found out based upon the search command of the channel command word 524, the control operation is moved to the next channel command word 526.

If the target record cannot be found based upon the search command of the channel command word 524, the control operation is moved to the channel command word 525. In the command portion of the channel command word 525, a transfer-in-channel (TIC) command X'08' has been stored which instructs that the control operation is moved to a channel command word of a position indicated in the address portion of this command. In this preferred embodiment, since the channel command word 524 positioned just before the channel command word 525 is designated as the skipped position of the control operation, the search command X'31' of the CCW 524 is again executed after the execution of this channel command. Such a repeating operation of the search command and the TIC command is continued until the target record can be found.

Upon detection of the target record, the execution of the channel program is moved to the channel command word 526. In the command portion of the channel command word 526, a read-to-ES command X'46' has been stored which reads data from the disk unit 118 and writes this data into the extended storage unit 124, whereas an address of a data storage region within the extended storage unit, to which the data is to be transferred, has been stored in the address portion. The data transferred from the disk unit 118 is stored into the extended storage unit 124 by this command operation.

Conversely, the data transfer from the extended storage unit to the disk unit 118 is executed by placing the channel command word 527 having the command word of a write-from-ES command X'45' at the storage position of the channel command word 526.

This method may be realized by newly employing the command code for instructing the data transfer operation with the extended storage unit 124. Although there is such a merit that the modifications in the recording formats of the operation request block (ORB) 506 and channel command word are not required, the execution of the direct data transfer operation to the extended storage unit can be performed only in the input/output unit in which the channel command for supporting the data transfer with the extended storage unit has been newly employed. That is to say, if the sorts of the input/output units used to perform the input/output operation are different from each other, since the channel command words are different from each other, the data transfer commands with the extended storage units must be separately employed for the respective input/output devices.

Figure 5:
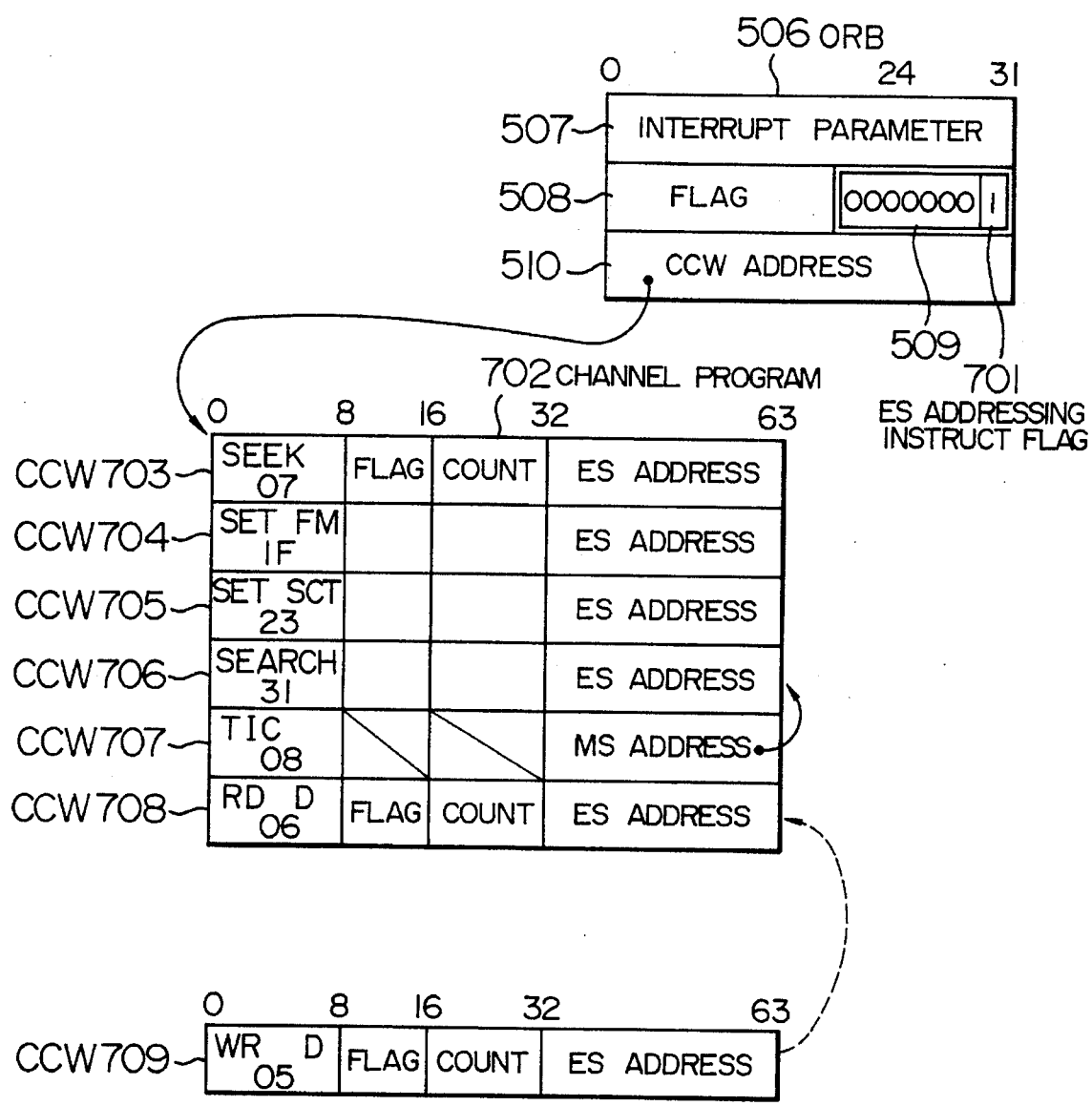
FIG. 5 represents a channel program with employment of an ORB flag.

In FIG. 5, there is shown another method for newly employing a flag indicative of an access demand for the extended storage unit in the operation request block (ORB) without modifying the channel command word.

In accordance with this new method, an extended storage addressing flag 701 is newly set to the lowermost bit in the zero fixing portion 509 within the operation request block (ORB) 506. When this addressing flag becomes 1, an address value indicative of an address for the extended storage unit 124 is stored in the address portion of the channel command word for constituting the channel program designated by this operation request block 506, except that the command code corresponds to the TIC command.

The arrangement from the channel command word 703 to the channel command word 707 within the channel program 702 is similar to that of the command shown in FIG. 4 from the seek command to the TIC command, and the address portions of the respective channel command words other than the TIC command represent addresses of the extended storage unit 124. The address portion of the TIC command indicates the address of the main storage unit, which implies that the control operation is moved to the channel command word 706 positioned just before this command.

The data transfer from the disk unit 118 to the extended storage unit 124 is instructed by the channel command word 708. Into the command portion of this channel command word, a read data command X'06' has been stored, whereas an address value indicative of an address of the extended storage unit 124 has been stored in the address portion thereof. The data transfer from the extended storage unit 124 to the disk unit 118 in the opposite direction to that of the above-described data transfer may be executed by employing a channel command word 709 having a write data command X'05' in the command portion instead of the channel command word 708.

There is an advantage of this method that since no specific channel command used to execute the data transfer operation with the extended storage unit need not be newly employed, the data transfer operation between an arbitrary input/output unit and the extended storage unit can be executed irrelevant to the sort of the unit.

Figure 6:
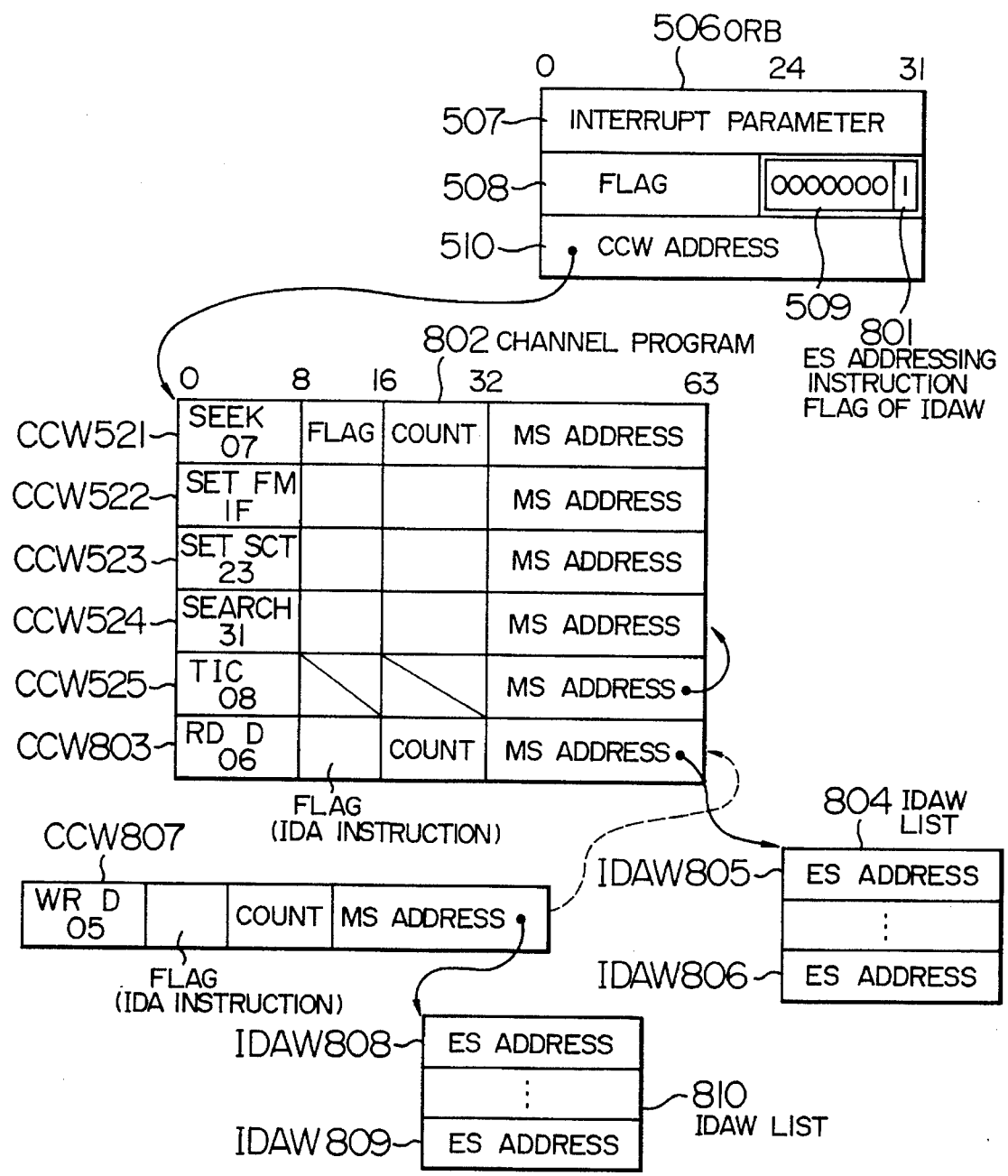
FIG. 6 illustrates a channel program with employment of an IDAW.

FIG. 6 illustrates another method for newly providing a flag indicating that if an indirect addressing word (IDAW) is utilized in the operation request block without modifying the channel command, an access demand of the extended storage unit is issued.

In accordance with this method, an extended storage address flag 801 when the indirect address is instructed is newly employed at the lowermost bit of the zero fixing portion 509 within the operation request block 506. When this flag becomes 1, an address value of the indirect addressing word 804 is stored into the channel command word for constituting a channel program designated in this operation request block 506, whereas the address of the extended storage unit 124 is stored into the indirect addressing word 804.

Up to the channel command word 525 from the channel command word 521, the seek command to the TIC command, which are similar to the commands shown in FIG. 4, have been stored into the channel program 802.

The data transfer from the disk unit 118 to the extended storage unit 124 is instructed by the channel command word 803. A read-data-command X'06' has been stored in the command portion of this channel command word, whereas indirect addressing (IDA) is designated in the flag portion. When the indirect addressing is designated, this address portion indicates a head address of the indirect address word list 804 in which the indirect addressing words (IDAW) 805 to 806 are arranged. It should be noted that the address value stored in the indirect addressing word indicates the address of the extended storage unit 124 when the vale of the flag 801 becomes 1. The data transfer from the extended storage unit 124 to the disk unit 118 in the transfer direction opposite to the above-described transfer direction, may be executed by employing a channel command word 807 having a write-data-command X'05' in the command portion instead of the channel command word 803. Also in this case, the address portion of the channel command word 807 represents a head address of the indirect address word list 810 in which the indirect addressing words (IDAW) 808 and 809 are arranged.

There are such advantages of this method that no specific channel command to execute the data transfer operation with the extended storage unit need to be newly provided, and also since the data transfer operation with the main storage unit can be realized unless the indirect addressing is utilized, the parameters of the seek command and the search command can be positioned on the main storage unit, the data transfer operation between an arbitrary input/output unit and the extended storage unit can be achieved irrelevant to the sorts of the units employed in the system.

Figure 7:
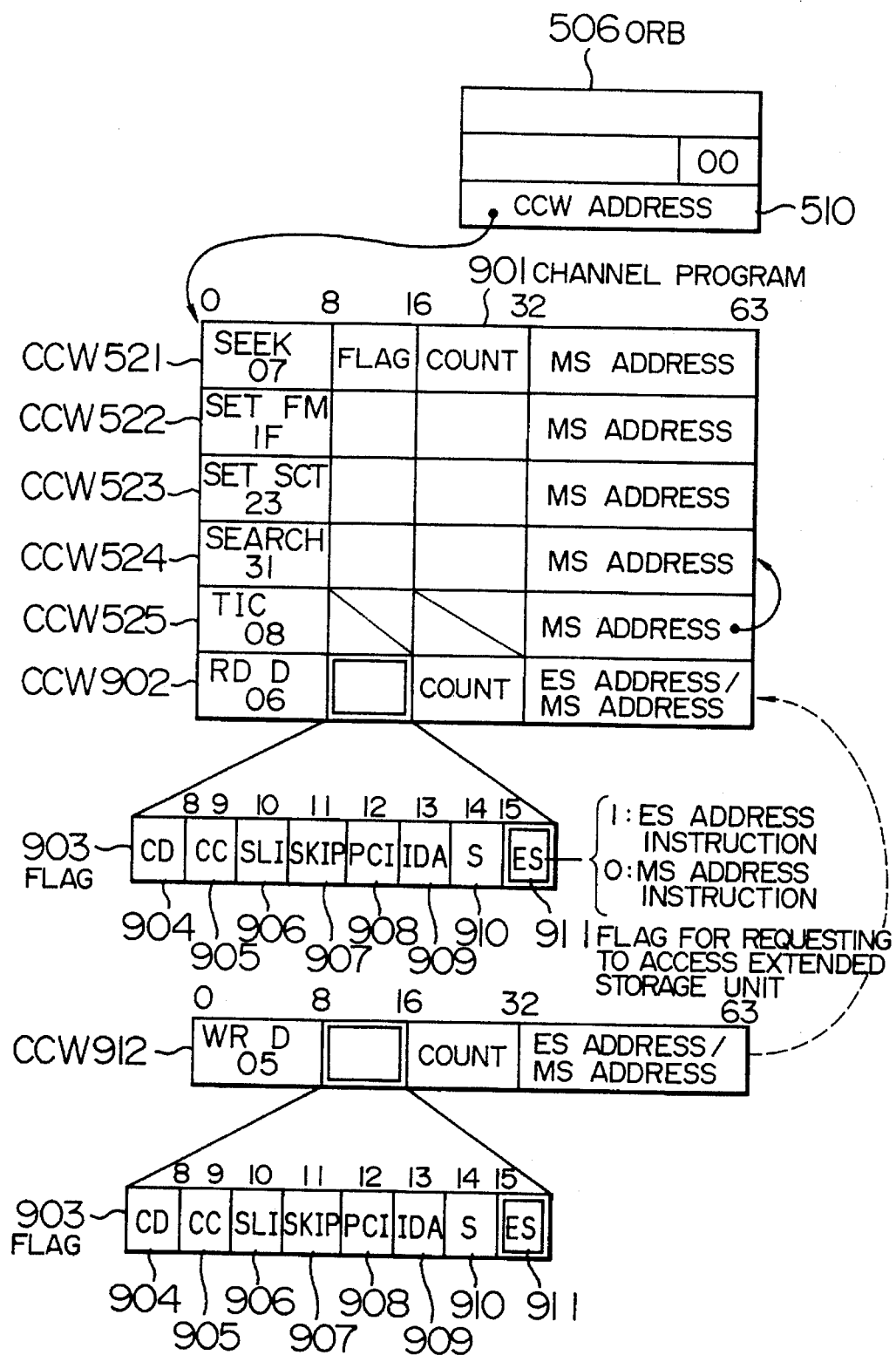
FIG. 7 shows a channel program with employment of a flag portion for a channel command word.

FIG. 7 shows a method for newly employing a flag for demanding to access an extended storage unit in a flag portion of a channel command word.

In this method, a seek command to a TIC command have been stored in a channel program 901 up to the channel command words 521 to 525 in a similar manner to the command arrangement shown in FIG. 4, and the data transfer from the disk unit 118 to the extended storage unit 124 is instructed by the channel command word. A read-data command X'06' has been stored in the command portion of this channel command word; a newly employed flag (ES) 911 for requesting to access the extended storage unit has been stored in the flag portion 903; when this flag 911 becomes 1, the address portion indicates the address value of the extended storage unit, whereas when this flag 911 becomes 0, the address pottion represents the address value of the main storage unit.

Among others, the flag portion 903 of the channel command word includes a chain data flag (CD) 904, a chain command flag (CD) 905, an incorrect-length-display suppressing flag (SL1) 906, a skip flag (SKIP) 907, a program control interrupt flag (PCI) 908, an indirect data addressing flag (IDA) 909 and a suspend flag (S) 910.

A data transfer operation from the extended storage unit 124 to the disk unit 118 in a direction opposite to the above-described data transfer direction, may be executed by employing a channel command word 912 having the write-data command X'05' in the command portion, instead of the channel command word 902. Also, in this data transfer operation, the flag portion 903 of the channel command word 912 owns the flag (FS) 911 for requesting to access the extended storage unit. If this value becomes 1, then the data write operation is carried out from the extended storage unit 124 to the disk unit. If this value becomes 0, then the data write operation from the main storage unit 111 is executed.

The merits of this method are given as follows. A specific channel command to execute the data transfer with the extended storage unit need not be newly employed. Since either the data transfer direction, or the data transfer destination may be designated to either the extended storage unit 124 or the main storage unit 111 for each of the channel commands, the parameters of the seek command and the search command may be positioned on the main storage unit. As a result, the data transfer operation can be performed between an arbitrary input/output unit and the extended storage unit irrelevant to the sorts of the units employed in this system.

Figure 8:
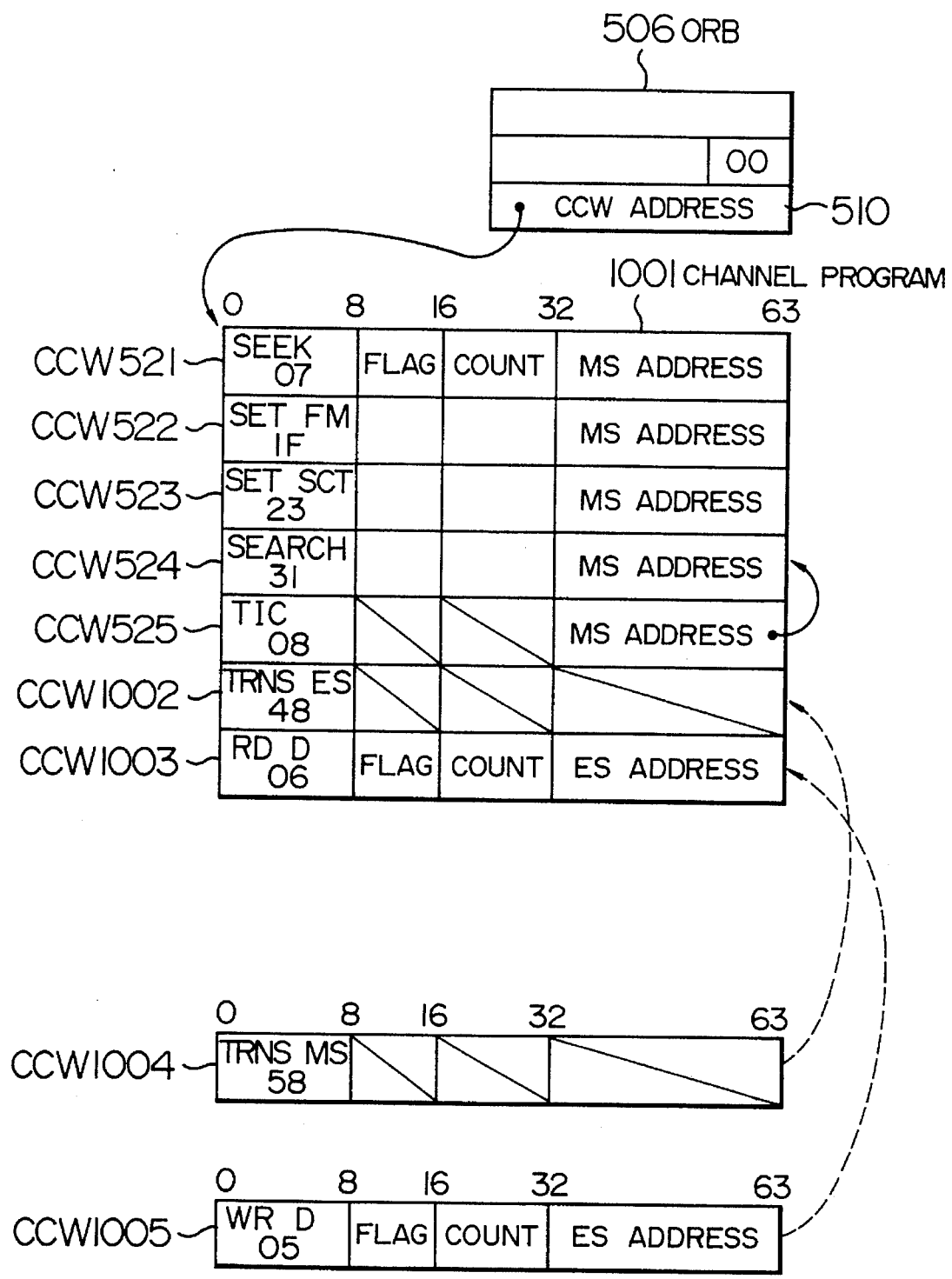
FIG. 8 indicates a channel program with employment of a change command for a data transfer unit.

FIG. 8 represents a method capable of selecting the data transfer operation to the extended storage unit and the data transfer operation to the main storage unit, in which a data transfer unit selecting command is newly utilized as the channel command word.

In this method, the command words from the seek command to the TIC command, which are similar to the commands shown in FIG. 4, have been stored in the channel program 1001 from the channel command words 521 to 525. Also in this method, the data transfer from the disk unit 118 to the extended storage unit 124 is instructed by the channel command words 1002 and 1003. The channel command word 1002 indicates that a transfer ES command X'48' has been stored in the command portion and a data access destination of a channel command word that will be executed thereafter corresponds to the extended storage unit 124. As a result, an address value stored in the address portion of the channel command word which is executed after this command has been executed, indicates an address of the extended storage unit 124. The channel command word 1003 performs the normal reading operation for the data from the disk unit 118, and transfers the data to the extended storage unit 124, while the read data command X'06' has been stored in the command portion.

When the data transfer unit is changed into the main storage unit 111, a transfer MS command X'58' indicated in the channel command word 1004 is employed.

The data transfer from the extended storage unit 124 to the disk unit 118 which is opposite from the above-described data transfer may be executed by utilizing the channel command word 1005 having the write data command X'05' at the command portion instead of the channel command word 1003. Also in this case, if the channel command code having the transfer ES command used to instruct the data transfer operation with the extended storage unit 124 has been executed before the channel command word 1005 is performed, the data transfer from the extended storage unit 124 to the disk unit 118 is performed.

In accordance with this method, although both of the transfer ES command and the transfer MS command must be newly provided as the specific channel commands used to execute the data transfer operation with the extended storage unit, since these commands are equal to the channel commands related only to the input/output processor 330, the specific commands for the data transfer with the extended storage unit are no longer provided for the respective input/output units.

Furthermore, since either the data transfer destination or the data transfer direction instructed by an arbitrary channel command word may be selected to any one of the extended storage unit and the main storage unit, the data transfer operation can be performed between the disk unit and the extended storage unit while maintaining the parameters of the seek command and the search command at the storage positions of the main storage unit.

As previously stated, a merit of this method is that no respective channel commands corresponding to the respective input/output units need be newly employed, and the data transfer operation by an arbitrary channel command word may be executed for the extended storage unit.

As previously explained, with reference to the channel program in FIGS. 4 to 8, the data transfer operations can be performed without employing the main storage unit as the data transfer buffer to the extended storage unit.

Subsequently, an operation of hardware in case that a data transfer operation between the input/output unit and the extended storage unit will now be explained without employing the buffer in the main storage unit as explained above. It should be noted that a hardware arrangement of an entire computer system is the same as that of FIG. 2. A more detailed description will be made of the data transfer control circuit 318 and the channel unit 332.

Figure 9:
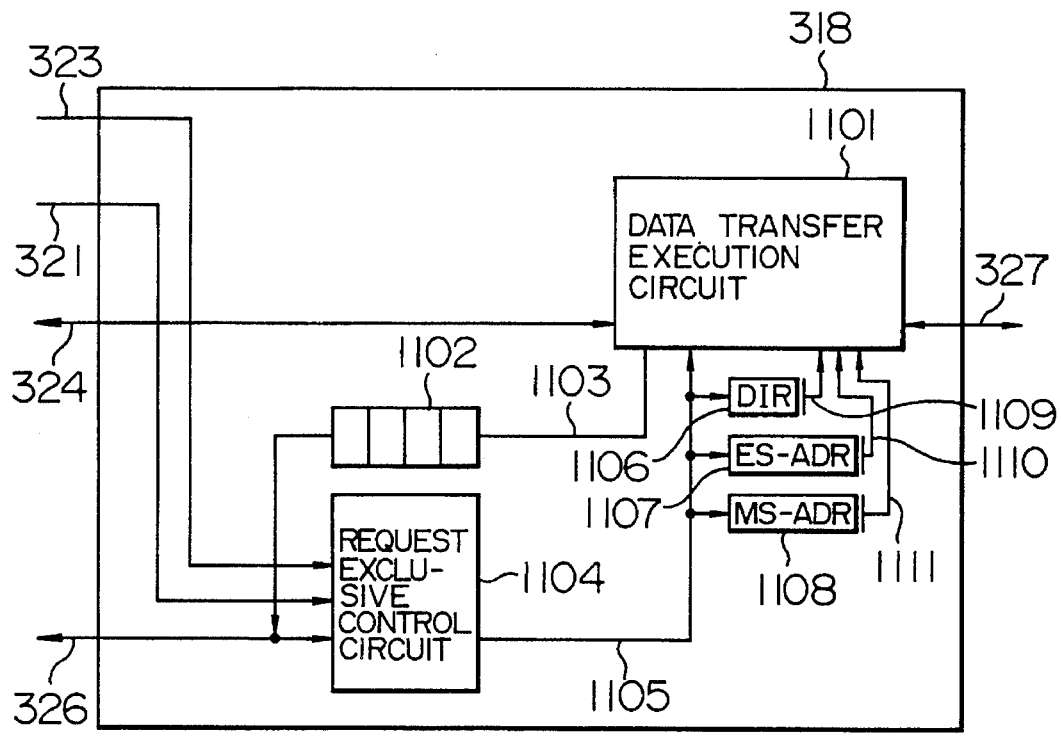
FIG. 9 shows an arrangement of an ES data transfer control circuit.

FIG. 9 schematically represents an arrangement of this data transfer control circuit 318. The data transfer control circuit 318 accepts a process request for a data transfer operation effected between the memory unit 110 and the extended storage unit 124 via the data transfer request signal line 323 from the instruction processor 313, the data transfer request signal line 321 from the instruction processor 312, and also the data transfer request signal line 326 from the input/output processor 330. The data transfer request signal lines 323, 321 and 326 are connected to a request exclusive control circuit 1104, and furthermore connected via a signal line 1105 to a data transfer execution circuit 1101, a transfer direction designation register 1106, an extended-storage-unit address register 1107 and a memory unit address register 1108.

The data transfer execution circuit 1101 obtains information required for the data transfer operation via the signal lines 1109, 1110 and 1111, commences the data transfer operation at the proper timing instructed by the signal line 1105, and sends out a completion signal from the signal line 1105 via the request exclusive control circuit 1104 to the data transfer request direction. Furthermore, the data transfer operation is executed between the memory unit 110 and the extended storage unit 124 with employment of the signal line 324 by which data transmission/reception with the memory unit 110 are performed, and also the signal line 327 by which data transmission/reception with the extended storage unit 124 are performed.

A data transfer completion announcement issued from the input/output processor 330 with respect to the transfer request is performed by responding information about whether or not the data transfer operation has been completed as the response information when the input/output processor 330 sends out a condition check request via the signal line 326. The data transfer execution circuit 1101 writes completion information into a transfer completion responding register 1102 via a signal line 1103 when the data transfer operation demanded from the input/output processor 330 has been accomplished. The input/output processor 330 may grasp conditions of the data transfer execution by investigating the contents of the transfer completion responding register 1102 via the signal line 326.

Figure 10:
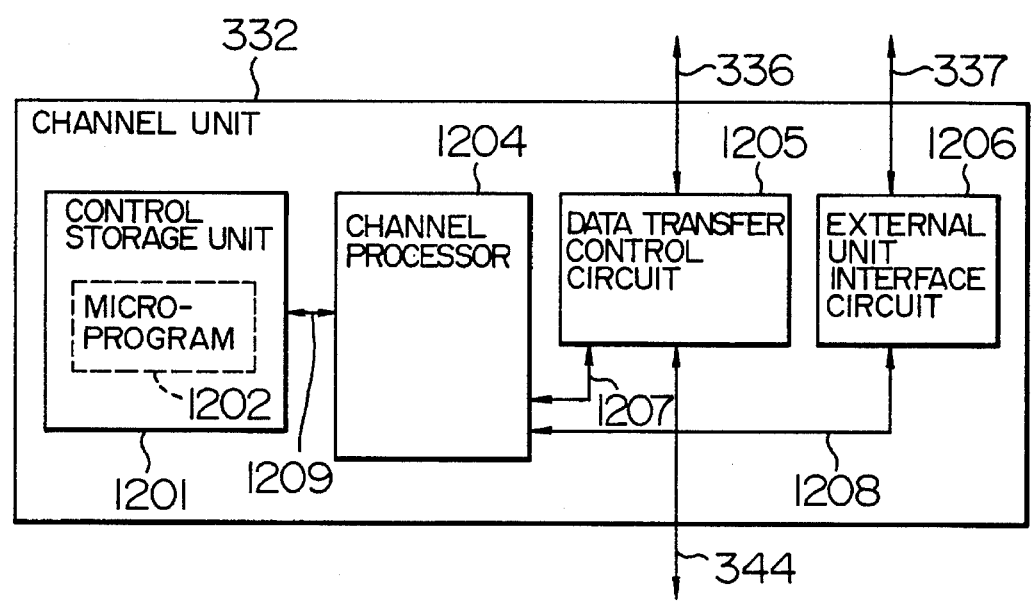
FIG. 10 represents an arrangement of a channel unit.

Referring now to FIG. 10, an arrangement of the channel unit 332 will be summarized.

The channel unit 332 is arranged by a channel processor 1204 operable under control of a microprogram 1202, a control storage unit 1201 connected via a signal line 1203 to the channel processor 1204, a data transfer control circuit 1205 connected via a signal line 1207 from the channel processor 1204, and an external unit interface circuit 1206 connected to the channel processor 1204 via a signal line 1208. To this data transfer control circuit 1205, both of the signal line 344 for connecting an external input/output unit and the signal line 336 used to execute the data transmission/reception with the memory unit are connected. To the external unit interface circuit 1206, the signal line 337 connected via an SC connection interface 331 to the ES data transfer control circuit 318 is connected.

Figure 11:
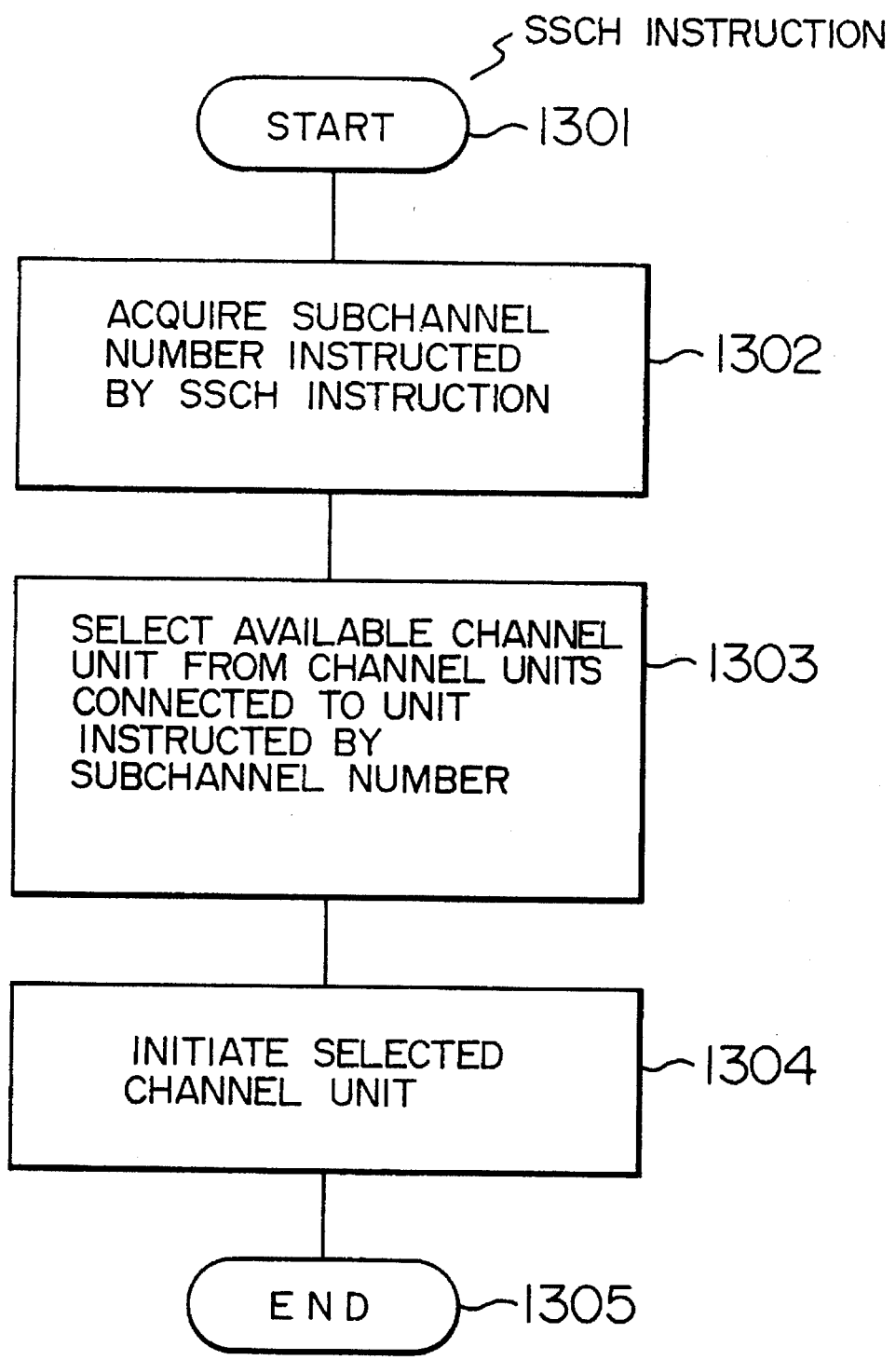
FIG. 11 is a flow chart for showing an operation of an input/output processor when an SSCH instruction is issued.

An operation of the input/output processor 330 in case that an SSCH instruction is executed on the instruction processor 312 or 313 will now be summarized with reference to FIG. 11.

Upon execution of the SSCH instruction, a control logic of the input/output processor 330 is initiated (1301), a subchannel number corresponding to the input/output unit designated by the SSCH instruction is obtained (1302), a selection is made of an available channel unit from the channel units instructed by the subchannel number and also connected by the input/output unit (1303), and the selected channel unit is initiated (1304), whereby the control is completed (1305).

Figure 12:
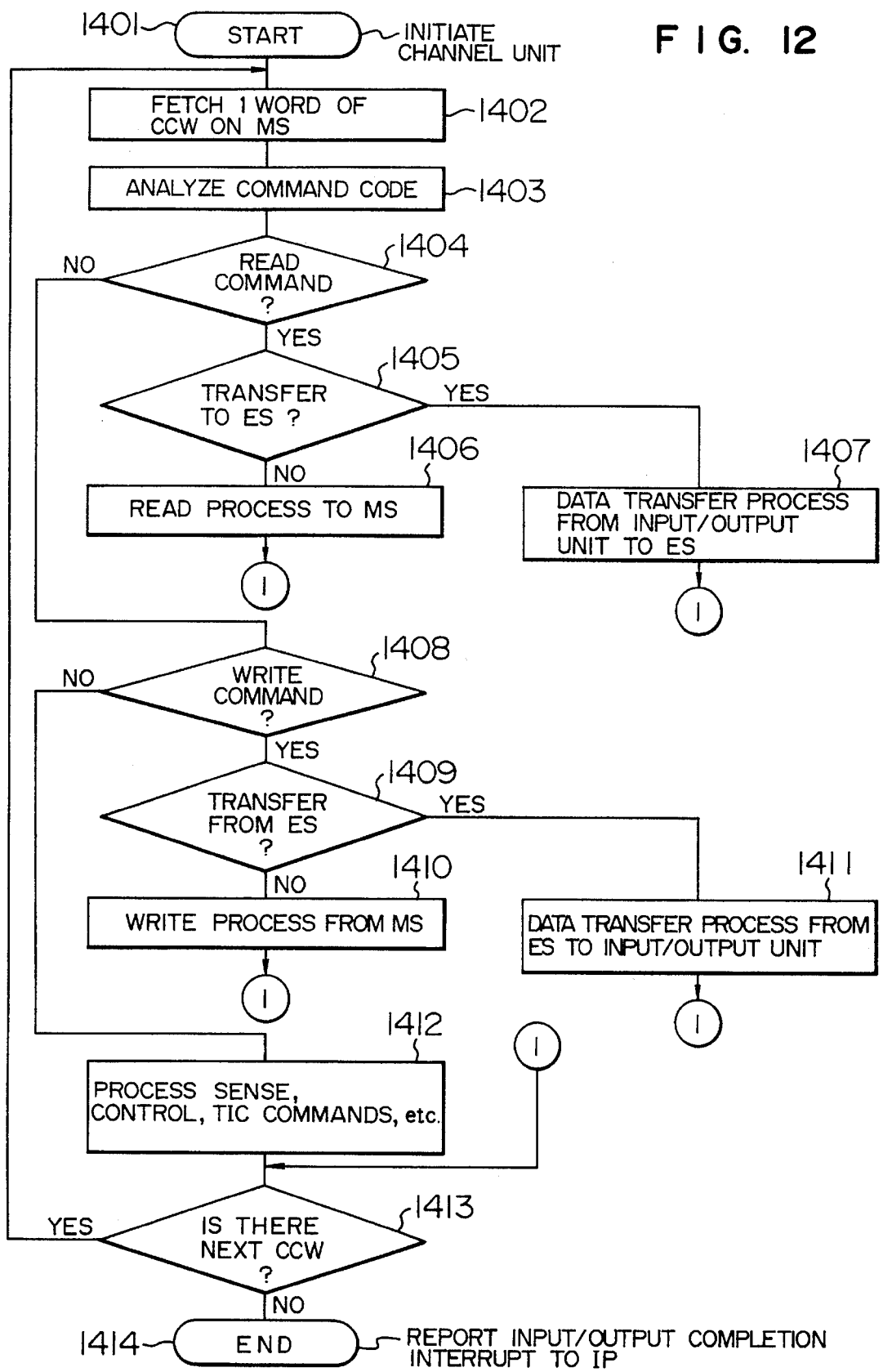
FIG. 12 is a flow chart for indicating an operation of a micro-program employed in a channel unit.

A control of a micro-program employed in the respective channel units (332 to 335) will now be explained with reference to FIG. 12.

Upon initiation of the channel unit by the input/output processor 330, the microprogram is initiated (1401), and then a single word of the channel command words which have been stored in the main storage unit 111 is read (1402). Furthermore, the command code contained in the command portion of this channel command word is analyzed (1403). If the analyzed command corresponds to the read instruction (1404) and also the data transfer to the extended storage unit 124 has been demanded (1405), the data transfer process from the input/output unit to the extended storage unit is performed (1407). Also, if the selected command corresponds to the read command (1404) and also does not correspond to the data transfer command to the extended storage unit 124 (1405), the data transfer process is performed from the input/output unit to the main storage unit 111.

If the operation instructed by the command portion of the channel command word does not correspond to the read command (1404), but correspond to the write command (1408), and also the data transfer request has been issued from the extended storage unit 124 (1409), then the data transfer process from the extended storage unit 124 to the input/output unit is executed (1411). Also, if this operation corresponds to the write command (1408), and does not correspond to the data transfer demand issued from the extended storage unit 124 (1409), the data transfer process from the main storage unit 111 to the input/output unit is executed (1410).

Furthermore, if the command designated by the command portion of the channel command word does not correspond to the read command (1404) but also does not correspond to the write command (1408), the command processes for sense, control and TIC commands, etc. are performed (1412). Furthermore, after the executions of the respective command processes have been accomplished, if there is a next channel command word to be executed (1413), the process operation is returned to the head process step in which the next channel command word is read (1402). To the contrary, if there is no subsequent channel command word (1413), then the channel operation is completed, and an input/output completion interrupt is reported to the instruction processor (312 or 313) (1414).

Figure 13:
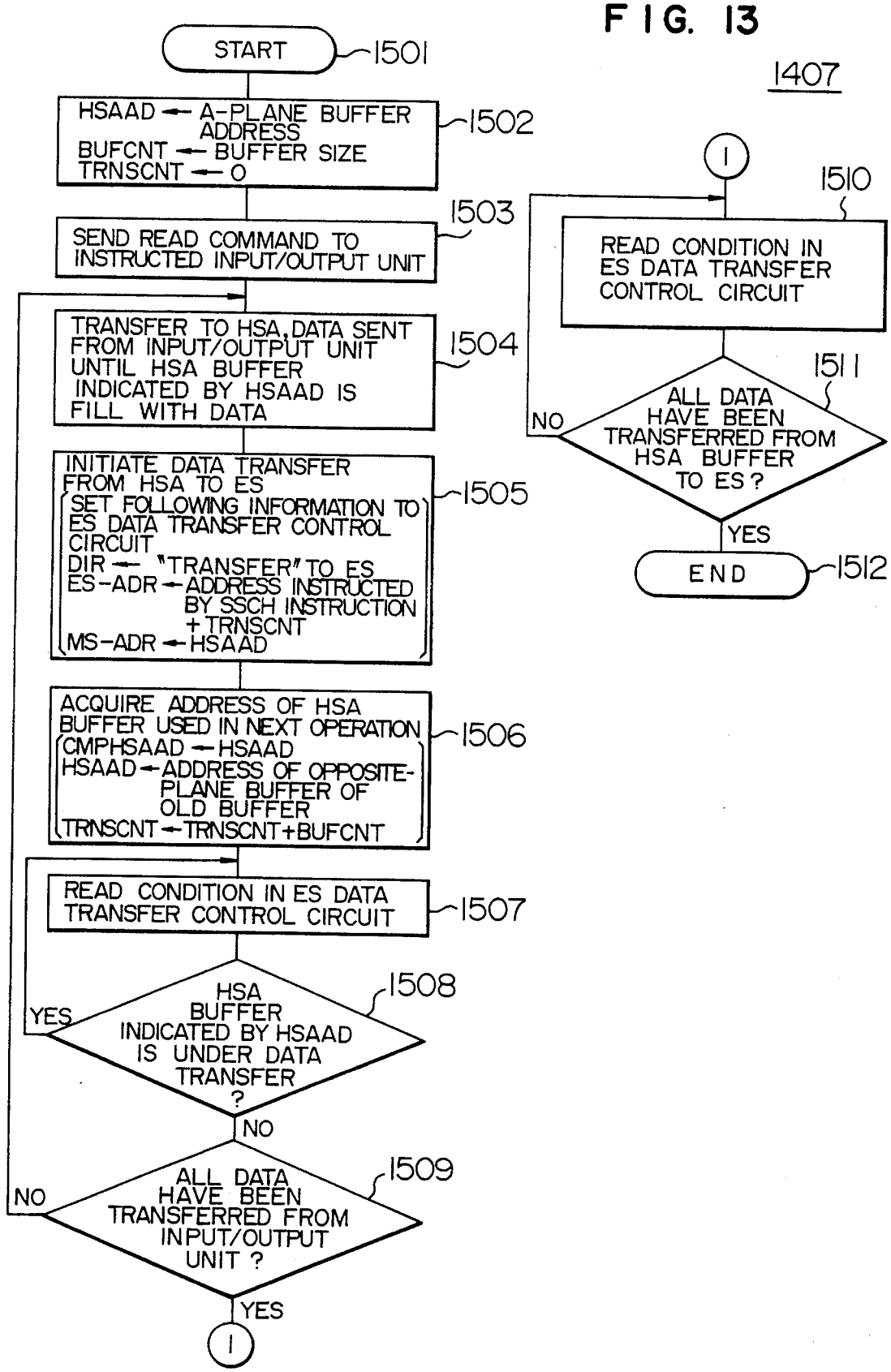
FIG. 13 is a flow chart for showing a data transfer operation effected from an extended storage unit to an input/output unit.

Thereafter, a data transfer process which is executed by the microprogram employed in the channel unit from the input/output unit to the extended storage unit, will now be explained with reference to FIG. 13. FIG. 13 represents a more detailed operation of the above-explained data transfer process (1407) effected from the input/output unit to the extended storage unit shown in FIG. 12.

In the flow operation shown in FIG. 13, upon initiation of the data transfer operation to the extended storage unit 124 (1501), for example, "a plane-A buffer address" is stored as a value into a variable "HSAAD" in accordance with an initialize operation, by which a data transfer operation is instructed with employing any one of the two-plane buffers 113 and 114 used for the data transfer operation and formed on the hardware system area (HSA) 112. A size of this buffer is stored in a variable BUFCNT, and then an initial value "0" is set to a variable TRNSCNT corresponding to a counter for a data transfer amount (1502). Then, the read command instructed by the channel command word is sent out to the input/output unit instructed by the SSCH instruction (1503).

Subsequently, the data transferred from the input/output unit is continuously transferred to the hardware system area 112 until the memory area of either the plane-A buffer 113 or the plane-B buffer 114 in the hardware system area 112, which is indicated by the variable HSAAD, is filled with the data, otherwise this memory area becomes a memory capacity of a predetermined transfer unit (1504).

Upon completion of the data transfer to the hardware system area 112, such a data transfer operation is initiated that the data stored in the plane-A buffer 112 or the plane-B buffer 113 in a memory full condition, which is indicated by the variable "HSAAD" is transferred to the transfer destination region 125 in the extended storage unit. 124. This initiation of the data transfer operation is executed by way of the following operations (1505). That is to say, a value of a transfer direction designation register (DIR) 1106 within the data transfer control circuit 318 is set to transfer the data in "a direction from the memory unit to the extended storage unit" from the input/output processor 330 via the signal line 326; a value of the extended storage address register (ES-ADR) 1107 is set to such a value as defined by adding the TRNSCNT value to the extended storage address stored in the channel command word instructed by the SSCH instruction; and also a value of a memory unit address register (MS-ADR) 1108 is set to the "HSAAD value" so as to send out the initiation request.

After the initiation of the data transfer operation to the extended storage unit 124 has been performed, an address of a buffer on the hardware system area which will be employed in the next operation is obtained without waiting for this completion. To this end, the content of the present variable HSAAD is saved into a variable CMPHSAAD. After the data transfer operation to the extended storage unit 124 has been initiated, the address of the buffer waiting for the completion of the data transfer operation is stored in the variable CMPHSAAD. Then, the address of the buffer with a plane opposite to the last plane for the buffer is stored in the variable HSAAD as a buffer address used in the next operation. In other words, if the buffer used just before corresponds to the plane-A buffer, then the buffer with the plane-B will be utilized in the next operation, and also the address value of the buffer with the A-plane is stored in the variable HSAAD. Furthermore, the value of TRNSCNT corresponding to the counter for the data transfer byte number is added by BUFCNT (namely, size of buffer) (1506).

In accordance with the present invention, the number of planes for the transfer buffer employed in the hardware system area 112 is not limited to two planes, but may be selected to a certain number. Even if a transfer buffer with such an arbitrary plane number is employed, a control operation similar to the above-described control operation may be utilized. In this case, the oldest buffer plane is selected as the buffer plane which will be employed in the next operation.

Next, a judgement is made of the data transfer condition by checking the contents of the transfer completion responding register 1102 within the data transfer control circuit 318 (1507). Another check is done whether or not the data stored in the buffer on the hardware system area, which is indicated by the variable HSAAD, is being transferred, and if the data of this buffer is being transferred, then the process operation waits for the completion of the data transfer operation (1508). If the data of this buffer has been transferred, a check is done whether or not the data transfer with the unit/output unit has been accomplished, whose data amount is designated by the channel command word (1509).

If all of the buffer data have not yet been completed, the process operation is returned to the previous step 1504 at which the next data transfer operation is continued. To the contrary, if the data transfer operation has been accomplished, then another check is again done with regard to the conditions of the data transfer control circuit 318 (1510). After all of the data transfer processes which have been initiated have been accomplished (1511), the process is ended (1512).

Figure 14:
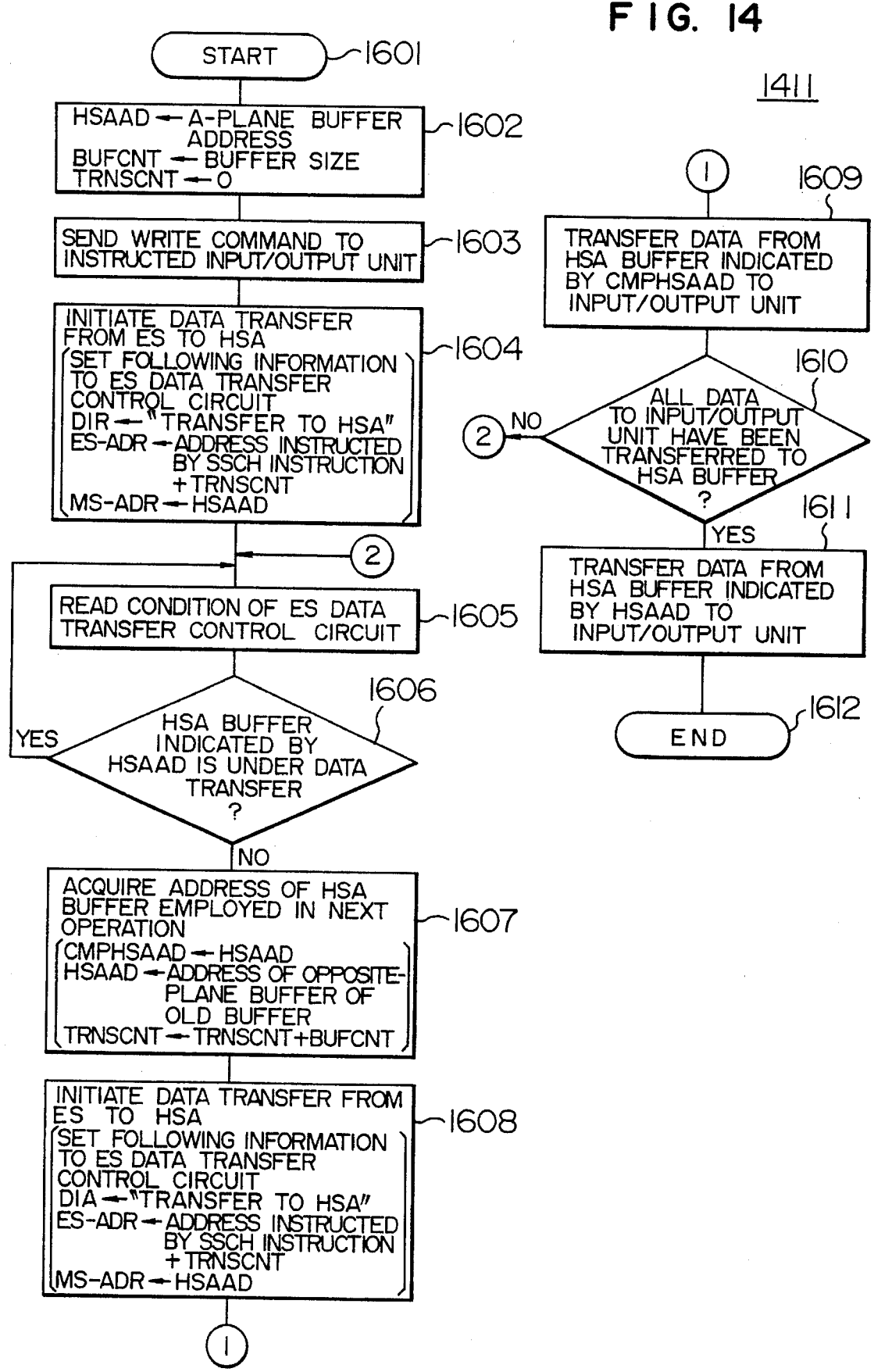
FIG. 14 is a flow chart for representing a data transfer operation from an extended storage unit to an input/output storage unit.

Referring now to FIG. 14, a description will be made of a data transfer process from the extended storage unit 124 to the input/output unit, which is executed by the microprogram in the channel unit. FIG. 14 indicates a detailed operation of the data transfer process (1411) which has been explained with reference to FIG. 12 and is carried out from the extended storage unit to the input/output unit.

Upon initiation of the data transfer operation from the extended storage unit 124 (1601), for example, "a plane-A buffer address" is stored as a value into a variable "HSAAD" in accordance with an initialize operation, by which a data transfer operation is instructed with employing any one of the two-plane buffers 113 and 114 used for the data transfer operation and formed on the hardware system area (HSA) 112. A size of this buffer is stored in a variable BUFCNT, and then an initial value "0" is set to a variable TRNSCNT corresponding to a counter for a data transfer amount (16029. Then, the write command instructed by the channel command word is sent out to the input/output unit instructed by the SSCH instruction (1606).

Next, the data transfer operation from the extended storage unit 124 to either the buffer 113 or the buffer 114 designated on the hardware system area 112 is initiated. This initiation of the data transfer operation is executed by way of the following operations (1505). That is to say, a value of a transfer direction designation register (DIR) 1106 within the data transfer control circuit 318 is set to transfer the data in "a direction from the extended storage unit to the memory unit" from the input/output processor 330 via the signal line 326; a value of the extended storage address register (ES-ADR) 1107 is set to such a value as defined by adding the TRNSCNT value to the extended storage address stored in the channel command word instructed by the SSCH instruction; and also a value of a memory unit address register (MS-ADR) 1108 is set to the "HSSAD value" so as to send out the initiation request (1604).

Thereafter, a judgement is made of the data transfer condition by checking the contents of the transfer completion responding register 1102 in the data transfer control circuit 318 (1605), and another check is done as to whether or not the data transfer operation of the buffer on the hardware system area, which is indicated by the "HSAAD" value, is being carried out. If the data transfer operation is being carried out, the process operation defined at the step 1605 is repeatedly performed so as to wait for a completion of the data transfer operation (1606).

Then, an address of an empty buffer on the hardware system area, to which the data transfer operation has not yet been executed from the extended storage unit 124, is obtained. To this end, the content of the present variable HSAAD is saved into a variable CMPHSAAD. After the data transfer operation to the extended storage unit 124 has been initiated, the address of the buffer waiting for the completion of the data transfer operation is stored in the variable CMPHSAAD. Then, the address of the buffer with a plane opposite to the last plane for the buffer is stored in the variable HSAAD as a buffer address used in the next operation. In other words, if the buffer used just before corresponds to the A-plane buffer, then the buffer with the plane-B will be utilized in the next operation, and also the address value of the buffer with the A-plane is stored in the variable HSAAD. Furthermore, the value of TRNSCNT corresponding to the counter for the data transfer byte number is added by BUFCNT (namely, size of buffer) (1607).

In accordance with the present invention, the number of planes for the transfer buffer employed in the hardware system area 112 is not limited to two planes, but may be selected to a certain number. Even if a transfer buffer with such an arbitrary plane number is employed, a control operation similar to the above-described control operation may be utilized. In this case, the oldest buffer plane is selected as the buffer plane which will be employed in the next operation.

Next, a data transfer operation is initiated which is performed from the transfer direction region 125 in the extended storage unit 124 to either the buffer 112 or the buffer 113 having the plane indicated by the variable "HSAAD". The initiation of this data transfer operation is similar to the process operation as defined at the step 1604 (1608).

Subsequently, just after the data transfer operation as defined at the step 1608 has been initiated, the data of the buffer having the plane with which the data transferred from the extended storage unit 124 have been filled, are transferred to the input/output unit. In other words, since the input/output unit is brought into a data receiving state by the write command sent out at the step 1603, the data transfer operation is executed from the buffer plane indicated by the variable "CMPHSAAD" via the input/output processor and the channel unit to the input/output unit (1609).

If all of the buffer data have not yet been completed, the process operation is returned to the previous step 1605 at which the next data transfer operation is continued. To the contrary, if the data transfer operation has been accomplished, then the data transfer is executed from the buffer plane indicated by the variable "HSAAD" via the input/output processor and the channel unit to the input/output unit (1611), and then this process is ended (1612).

In accordance with the above-described preferred embodiment of the present invention, even if the data transfer buffer is not employed between the extended storage unit and the input/output unit on the main storage unit under control of the operating system, a plurality of transfer buffers having relatively small memory capacities are provided in the hardware system area. As a consequence, a large quantity of transfer buffers are no longer required and the input/output operation with the great data transfer throughput can be realized even when a large amount of data are transferred.

According to the present invention, under such a condition that the hardware performance owns a high-speed data transfer more than several hundreds MB/second, and also a large capacity of data higher than several tens MB (megabytes) is transferred within a single data transfer operation, which is required from the software, even when no data transfer buffers are provided on the main storage unit, both of the data transfer operation between the input/output unit and the buffer and the data transfer operation between the extended storage unit and the buffer can be executed in the parallel mode by providing only the buffer having a relatively small memory capacity below than several hundreds KB on the hardware system area. Therefore, the data transfer operation can be executed between the extended storage unit and the input/output unit with the substantially upper limit value of the hardware performance.

We claim:

1. A data transfer system, comprising:

an instruction processor;

a memory unit including a main storage accessible by a program to be executed by said instruction processor, and a hardware area inaccessible by said program, said hardware area having at least two plane data transfer buffers;

an extended storage unit for performing data transfer operation to and from said memory unit;

a channel unit for performing data transfer operation between an input/output unit and said memory unit and between said input/output unit and said extended storage unit; and data transfer circuit initiating means for initiating data transfer operation between said data transfer buffers and said extended storage unit on a basis of an instruction from said channel unit, wherein said instruction processor forms and issues to said channel unit a series of channel command words for specifying input/output operations to said input/output unit and designating either one of said main storage and said extended storage unit as an object of data transfer, and wherein when said series of channel command words designate said extended storage unit as an object of data transfer, said channel unit instructs said data transfer initiating means to initiate an alternating operation wherein one of said data transfer buffers performs a first input/output operation to or from said input/output unit while the other of said data transfer buffers performs a second input/output operation from or to said extended storage unit, and at a time when said one of said data transfer buffers has completed the first input/output operation to or from said input/output unit, said one of said data transfer buffers then performs a third input/output operation from or to said extended storage unit while said other of said data transfer buffers performs a fourth input/output operation to or from said input/ output unit, respectively, without a new channel command word from said instruction processor; wherein said instruction processor issues an input/output initiation instruction for initiating the input/output operations of said channel unit by using an operation request block for defining a location of said series of channel command words, and wherein both an identifier corresponding to said extended storage unit comprising an object of data transfer by series of channel command words, and also a flag indicating that said address portion in said series of channel command words that indicates an address of said extended storage unit are included in said series of channel command words.

2. The data transfer system as claimed in claim 1, wherein said instruction processor issues an input/output initiation instruction for initiating a one of the input/output operations of said channel unit by designating said series of channel command words; and said series of channel command words contain information to instruct the data transfer with said extended storage unit, an address portion indicative of an address of said extended storage unit, and an instruction for instructing a read operation of data or a write operation of data.

3. The data transfer system as claimed in claim 1, wherein said instruction processor issues an input/output initiation instruction for initiating the input/output operations of said channel unit by using an operation request block for defining a location of said series of channel command words and when an indirect address designation is employed in said series of channel command words, both an identifier corresponding to said extended storage unit comprising an object of data transfer by said series of channel command words, and a flag for indicating that an indirect address word designated by said address portion of said series of channel command words is an address of said extended storage unit are included in said series channel command words.

4. The data transfer system as claimed in claim 1, wherein said instruction processor issues an input/output initiation instruction for initiating the input/output operations of said channel unit by designating said series of channel command words; and both information to instruct the data transfer with said extended storage unit, and a flag indicating that the address portion is an address of said extended storage unit, are provided within said series of channel command words.

* * * * *